Aug. 15, 1967    W. L. ROBB ETAL    3,335,545
GAS SEPARATION BY DIFFERENTIAL PERMEATION
Filed July 1, 1965

Inventors:
Walter L. Robb;
Donald L. Reinhard,
by Leo J. Martosi
Their Attorney 3,335,545
GAS SEPARATION BY DIFFERENTIAL
PERMEATION
Walter L. Robb, Scotia, and Donald L. Reinhard, Ballston Lake, N.Y., assignors to General Electric Company, a corporation of New York
Filed July 1, 1965, Ser. No. 468,727
9 Claims. (Cl. 55—16)

This invention relates to the separation of gases by differential permeation and more particularly by permeation through liquid or quasi-liquid films behaving substantially as polymeric films.

Heretofore it has been known that thin, nonporous polymer membranes (e.g. silicone rubber, polycarbonate resins, ethyl cellulose and cellulose propionate) can be used to separate gases because of the fact that certain gases will permeate through the membranes at a faster rate than other gas components of the mixture. Such a separation process does not operate on the same principle as separation of gases by flow through porous septa where advantage is taken of difference in the rates of flow under a substantial pressure differential of the component gases through the pore structure. In the processes of the latter nature, the factor of separation depends on the ratio of the square roots of the molecular weights of the gases to be separated. In the case of a carbon dioxide-oxygen system, for example, the separation factor for a porous system would be a maximum of 1.17. In contrast thereto the process of this invention entails a permeation (diffusion of a dissolved gas through a membrane) of the gas mixture through the body of the membrane rather than through pores and depends on the fact that certain gases permeate through the membrane in this manner at a considerably faster rate than do other gases from which separation is to be effected.

Usually the process of separation is carried out by continuously flowing a stream of the gas mixture to be separated in contact with one side of the membrane, maintaining a total (or partial) pressure drop across the membrane, allowing a portion of the gas mixture to permeate from the higher to the lower pressure side of the membrane, and continuously removing a component-rich gas mixture from the lower pressure side.

In the instant invention although the method of separation is similar to that described above, it has been unexpectedly found that the solid polymer barrier can be replaced by a liquid film (or a quasi-liquid film) to function as the permeable membrane with considerable increase in the degree of separation.

Stabilization and support of this liquid film can be effected in a number of ways. Thus, the thin liquid membrane can be supported on a porous unwet backing having such fine holes that the liquid does not run through the porous material; the liquid film can be supported on a non-interacting polymer film chosen so that the ratio of permeation rate to thickness will be appreciably higher for the polymer than for the liquid film thereby insuring that the liquid film is the controlling permeation factor. The term "quasi-liquid film" refers to a film of immobilized liquid such as may be prepared by swelling a polymer film with the liquid proposed for effecting the separation, with the swelling being effected to the extent that the liquid itself becomes the controlling resistance to permeation. Another means by which the liquid film can be stabilized is by the formation of gel using the liquid of interest.

Although this invention is broadly directed to the use of a liquid film as a means for gas separation and is not intended to be limited to the separation of particular gaseous components by the use of particular liquid films, there are certain gas separations, such as the separation of $CO_2$ and $O_2$, which are of particular interest, as for example, for maintaining a life-supporting environment in a hospital oxygen tent or in a space vehicle or submarine.

Of all the polymeric membranes, it appears that the highest separation factor at about 25° C. (permeability of $CO_2$/permeability $O_2$ or $Pr_{CO_2}/Pr_{O_2}$) has a value equal to 9, and unfortunately, this separation factor applies to a polymer film having a relatively low permeation rate. In the case of silicone rubber the separation factor $(Pr_{CO_2}/Pr_{O_2})$ is approximately 5.5 at room temperature. While separation factors of such magnitude may be useful in certain applications, separation factors having considerably higher values would be very desirable, particularly for the application recited above.

As an example of the effectiveness of this invention, tests have shown that a film of water supported on a very thin silicone rubber film will yield a separation factor as high as 30 for carbon dioxide relative to oxygen. Furthermore, the rate of permeation through such a composite film construction is very high, because water has approximately the same permeation rate for $CO_2$ as does silicone rubber. Hence, for a composite membrane in which the water layer is 10 times as thick as the silicone rubber, the separation factor of the assemblage is predominantly that of the water. In addition it has been determined that $CO_2$ is 20 times as permeable as $H_2$ through a water film, this being a higher separation factor than has been measured for any polymeric film.

The separation factors for $CO_2$ and $O_2$ and $H_2$ through a water film are merely representative of the capabilities of a liquid film, when employed as permeability barrier. The prime advantage of this discovery is the fact that the way has been opened thereby to the consideration of a much wider range of chemical compounds as barrier materials than previously existed, since the search need no longer be limited to materials, which are already in the form of polymeric films.

Therefore, a principal object of this invention is the provision of permeation means depending upon the permeation of a liquid barrier as the primary mechanism of gas separation.

It is another object of this invention to provide an aggregate construction embodying a large percentage of immobilized liquid to achieve separation factors for carbon dioxide and oxygen in excess of about 20.

It is a further object of this invention to provide a method for providing stabilized liquid films (referred to herein as quasi-liquid films) having permeation characteristics comparable to those for the pure liquid.

The above and other objects are secured by effecting the separation of gases by the use of a permeable membrane comprising either a porous or permeable support having a thin film of liquid thereover or a stabilizing medium containing a large percentage of liquid entrapped (immobilized) therein.

The exact nature of this invention will be readily apparent from the consideration of the following specification related to the annexed drawing in which.

Figure 1:
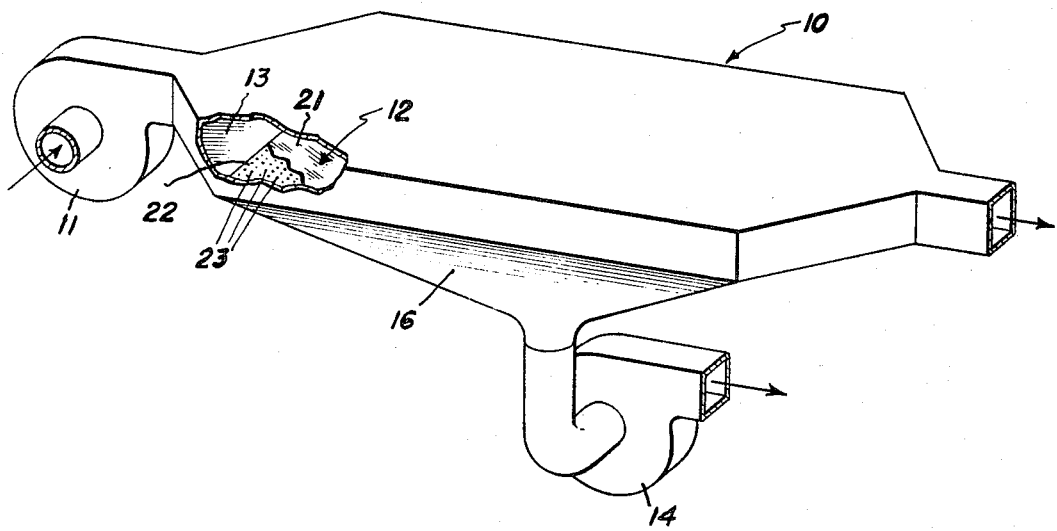
FIG. 1 is a three-dimensional view (partially cut away) illustrating a structure embodying a liquid barrier in accordance with this invention whereby the separation of gases may be effected by permeation.

As shown in FIG. 1, the apparatus 10 suitable for effecting the separation of gases by permeation is relatively simple. The process is carried out by continuously flowing (as by pump 11) a stream of the gas mixture to be separated so that it passes in contact with one side of permeable membrane 12 while a pressure differential is maintained across the membrane 12 with the gas mixture to be separated being at the higher pressure. Simultaneously, the gas, which has permeated through membrane 12, is removed from the low pressure side of the device. Thus, the gas mixture to be separated is introduced into chamber 13 and such gaseous components as permeate through composite membrane 12 are removed by suction pump 14 from chamber 16, the pressure in chamber 13 being greater than the pressure in chamber 16. Composite membrane 12 comprises a liquid layer that may be supported in a number of ways, several of which are shown in FIGS. 2, 3 and 4.

Figure 2:
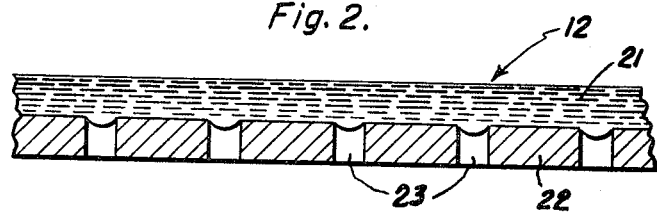
FIG. 2 is a sectional view taken through the composite film construction of FIG. 1 showing one arrangement for supporting a liquid permeable membrane.

In the arrangement shown in FIG. 2 for composite layer 12 a film of liquid 21 is shown supported on the unwetted porous plate 22 which, for example, may be a porous polytetrafluoroethylene membrane or a finely woven paper, cloth, screen or sintered plate treated with a non-wetting agent, such as polytetrafluoroethylene. Because plate 22 is unwet by the liquid in film 21 and, because the holes 23 are of very small diameter, the surface tension of the liquid is sufficient to span the film across individual holes without allowing the liquid to pass through. Gases permeating down through film 21 simply pass through holes 23 to the region below (chamber 16).

Figure 3:
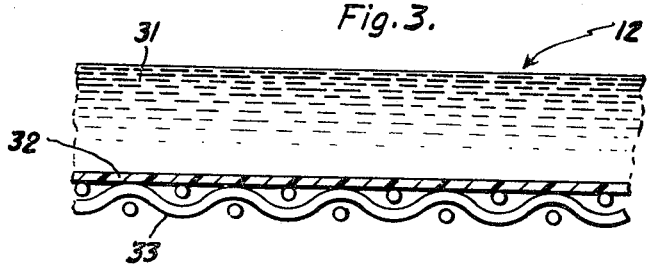
FIG. 3 is a view similar to FIG. 2 showing a second arrangement for supporting a liquid permeable membrane.
Figure 4:
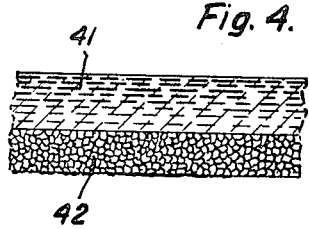
FIG. 4 is a view similar to FIG. 2 showing still another arrangement for supporting a liquid film, the particular film illustrated being one of immobilized liquid.

In the arrangement shown in FIG. 3, the composite film 12 is made up of a film of liquid 31 retained by and upon a thin permeable membrane 32, as for example silicone rubber. Mechanical support therefor, when required, is supplied by some perforated member, as for example screen 33. Preferably the thickness of the film of liquid in proportion to the thickness of the membrane 32 will be such that the permeability of the composite film 12 will be controlled by the permeability of the liquid film 31.

In the case of a composite film of water and silicone rubber, for example, the relative thicknesses of the film of water and the silicone rubber will be such that the water is present in a layer at least about 10 times as thick as the thickness of the silicone rubber, which may be as thin as 0.1 mil, whereby the separation factor will be mainly that of the water. In such an arrangement, tests show that the composite membrane 12 yields a separation factor for $CO_2/O_2$ of 22–30. With respect to the gases $CO_2$ and $H_2$, it has been found that $CO_2$ is 20 times as permeable as $H_2$. The values recited for both gas systems are higher than separation factors previously measured for any polymeric film regardless of the temperature of the system. Fortunately, the water film has a very high permeability rate, having, for example, approximately the same permeation rate for $CO_2$ as is exhibited by silicone rubber, which has the highest permeation rate for $CO_2$ of any polymeric material.

In tests conducted with a film of liquid diethylene glycol supported on a permeable membrane, the permeability of diethylene glycol was determined to be particularly of value for the separation of $CO_2$ from $O_2$, $N_2$, or $H_2$ as shown in Table I:

TABLE I.—ROOM TEMPERATURE PERMEATION IN DIETHYLENE GLYCOL

| Gas | Pr $\dfrac{\text{cc. gas NTP, cm. thick}}{\text{sec., sq. cm., cm. Hg}}$ |
| --- | --- |
| $CO_2$ | $14 \times 10^{-9}$ |
| $H_2$ | $1.6 \times 10^{-9}$ |
| $O_2$ | $1 \times 10^{-9}$ |
| $N_2$ | $0.5 \times 10^{-9}$ |

Although the $Pr_{CO_2}/Pr_{O_2}$ ratio for diethylene glycol is less than that of water, it still exceeds that of any known polymeric material at ordinary temperatures. In addition this glycol has a much lower vapor pressure than water thereby providing greater convenience in use.

There are many applications in which it is preferable to provide the liquid film in an immobilized state as a thin solid film. Such a construction is shown in FIG. 4. Therein a membrane and support therefor is shown, which membrane behaves substantially as a liquid film (with regard to its permeability characteristics) even though the large amount of liquid incorporated in the film does not alter the physical characteristics thereof, which remain typical of a solid film. In the particular arrangement shown, the immobilized water film 41 is supported on a porous support, in this case, a plate of sintered metal 42.

One method for immobilizing liquid is by the preparation of a gel. In the case of water, this was accomplished by adding as little as 1%, by weight, of agar-agar to the water. The resulting material is flexible, can be cast in thin films and can be handled like a polymeric membrane in a manner unsuitable for a truly liquid film. Although such a film will require support, the supporting structure (though porous) need not be unwetted. As an example, a 5 mil gel film prepared using water and agar-agar has been cast and supported on untreated paper.

The permeability characteristics of such a composite film has been established by casting a 70 mil film of gel and supporting the gel on a 3 mil silicone rubber film. Oxygen and carbon dioxide permeation measurements (neglecting the resistance of the comparatively thin silicone rubber) established permeation values of $$10 \times 10^{-9} \ \frac{\text{cc. of gas, cm.}}{\text{sec., cm.}^2 \text{ cm. Hg}}$$

for oxygen and $$244 \times 10^{-9} \ \frac{\text{cc. of gas, cm.}}{\text{sec., cm.}^2 \text{ cm. Hg}}$$

for carbon dioxide. These values compare relatively closely to those found for the permeability values of these same gases through a pure liquid water layer supported on silicone rubber.

A second method also successfully employed with water is to plasticize a polymer film with the liquid to serve as the permeable medium. As an example, polyvinyl alcohol (PVA) film has been exposed to water-saturated gas. As the PVA film becomes plasticized, the film becomes thicker (by as much as a factor of about two) with the swelling occurring as the result of the taking up of water by the film. Tests have shown that this plasticized PVA film exhibits a separation factor ($PR_{CO_2}/Pr_{O_2}$) of 36 for carbon dioxide and oxygen. This is an unexpectedly high value for the separation factor, because even water films, per se, do not yield this high a value.

Polyvinyl alcohol will gradually dissolve in the water taken up thereby, especially under increased temperature conditions. However, this disadvantage may be offset by crosslinking the PVA while the film is in the swollen plasticized condition, as by the use of electron irradiation by the method taught in U.S. Patent 2,897,127—Miller. When crosslinked, the PVA film no longer will dissolve and hence becomes a permanent membrane together with its immobilized water content. Measurements of permeation of a plasticized film so crosslinked establishes that the crosslinking does not materially affect the permeation rates.

Therefore, by this discovery it has definitely been established that it is not only feasible, but productive of increased performance to employ liquid films, either supported or immobilized, as permeable barrier mediums. The performance of such liquid barriers are not only markedly superior to that of ordinary polymer films insofar as separation factors exhibited, but in addition the permeation rates exhibited, likewise, are high. It has further been indicated that solid barriers within which the liquid medium has been trapped (as high as about 50% by weight) provide unexpectedly large separation factors, in the case of PVA plasticized with water being even higher than is found in the case of water film in the non-immobilized state.

It is to be understood that the invention as claimed contemplates the term "liquid" as not being limited to pure liquids, but including mixtures of liquids and solutions of solids in liquids such as might be used to modify the pH thereof or to change the concentration of specific ionic species as such modifications are considered obvious to one of ordinary skill in the art.

What we claim as new and desire to secure by Letters Patent of the United States is:

1. In a process for the alteration of the composition of a mixture of gases wherein the initial mixture of gases is brought into contact with one side of a permeable membrane and a difference in partial pressure for specific gaseous components is maintained between said one side and the opposite side of said membrane whereby said specific gaseous components permeate through said film to produce a gas mixture on said opposite side altered from the composition of the initial mixture, the improvement comprising the step of:
    (a) conducting the permeation of said specific components through a thin stationary liquid film.

2. The improvement in the method for altering the composition of a gas mixture substantially as recited in claim 1 wherein the stationary liquid film comprises a thin film of water supported on a porous backing.

3. The improvement in the method of altering the composition of a gas mixture substantially as recited in claim 1 wherein the stationary liquid film is a film of water supported on a thin polymer membrane, the relative thicknesses of said film of water and said polymer membrane being such that the water is the controlling factor in the permeation.

4. The improvement in the method of altering the composition of a gas mixture substantially as recited in claim 1 wherein the film of water has been immobilized in the form of a gel.

5. The improvement in the method of altering the composition of a gas mixture as recited in claim 1 wherein the liquid film is a polyvinyl alcohol film plasticized with water.

6. In an apparatus for altering the composition of a mixture of gases, the apparatus comprising a chamber, a portion of the wall area of the chamber being a permeable membrane, means in communication with the chamber for conducting gas thereto into contact with the inner side of the permeable membrane and means for removing from the outer side of the permeable membrane a gas mixture altered from the initial composition, the improvement comprising:
    (a) the permeable membrane comprising a thin stationary substantially uniform liquid barrier extending over the entire area of said permeable membrane,
        (1) said liquid barrier having a thickness effective to control permeation of gaseous components through said permeable membrane, and
    (b) means for supporting said liquid barrier.

7. The improvement recited in claim 6 wherein the liquid barrier comprises an immobilized liquid film.

8. The improvement recited in claim 6 wherein the liquid barrier consists of a water film and the supporting means is a perforated plate having an unwetted surface.

9. The improvement recited in claim 6 wherein the liquid barrier consists of a liquid film supported on a thin solid permeable membrane.

References Cited

UNITED STATES PATENTS

| | | | |
|---|---|---|---|
| 1,518,784 | 12/1924 | Gibson | 55—39 |
| 2,584,785 | 2/1952 | Bowman et al. | 55—16 X |
| 2,650,670 | 9/1953 | Cichelli | 55—158 X |
| 2,972,349 | 2/1961 | De Wall | 210—321 X |
| 3,133,132 | 5/1964 | Loeb et al. | |
| 3,220,960 | 11/1965 | Wichterle | 210—321 X |
| 3,225,524 | 12/1965 | Berrain | 55—269 |
| 3,244,763 | 4/1966 | Cahn | 55—16 |

FOREIGN PATENTS 270,287 8/1928 Great Britain.

REUBEN FRIEDMAN, *Primary Examiner.*

J. W. ADEE, *Assistant Examiner.*